US005909823A

United States Patent [19]

Ranft et al.

[11] Patent Number: 5,909,823

[45] Date of Patent: Jun. 8, 1999

[54] ANTI-PILFERAGE DOOR SYSTEM FOR A VENDING MACHINE

[75] Inventors: Philip Malone Ranft, Ballwin; Robert J. Reese, St. Charles; Frank Leonard Walter, Maryland Hgts, all of Mo.

[73] Assignee: Crane Co., Stamford, Colo.

[21] Appl. No.: 09/169,637

[22] Filed: Oct. 9, 1998

[51] Int. Cl.$^{6}$ .......... B65G 59/00

[52] U.S. Cl. .......... 221/129; 221/247

[58] Field of Search .......... 221/12, 125, 127, 221/129, 191, 247, 248, 249, 194; 312/291

[56] References Cited

U.S. PATENT DOCUMENTS

| | | | |
|---|---|---|---|
| 3,174,646 | 3/1965 | Johnson | 221/129 |
| 3,344,953 | 10/1967 | Krakauer et al. | 221/75 |
| 3,901,366 | 8/1975 | Schuller et al. | 194/4 |
| 3,940,016 | 2/1976 | Krakauer | 221/129 |
| 4,094,440 | 6/1978 | Lotspeich | 221/12 |
| 4,171,752 | 10/1979 | Pertinen | 221/84 |
| 4,196,951 | 4/1980 | Lotspeich | 312/218 |
| 5,375,737 | 12/1994 | Ficken | 221/194 |

*Primary Examiner*—Kenneth Noland

*Attorney, Agent, or Firm*—Senniger, Powers, Leavitt & Roedel

[57] ABSTRACT

A vending machine having an anti-pilferage door mechanism with a delivery door interconnected through linkage to an anti-pilferage door and a rear door which come together to close off the opening for the product storage area to the product dispensing chamber when the delivery door is opened by a customer thus preventing any opening which would allow a pilferage device such as a wire to be inserted through the delivery door opening up into the product storage area. The linkage which connects the delivery door to the anti-pilferage door and rear door is on one side of the dispensing chamber and a spring biasing mechanism is mounted on an opposite side of the chamber and assists in biasing the delivery door closed while providing a force reduction exerted by the spring as the door is opened.

8 Claims, 10 Drawing Sheets

ANTI-PILFERAGE DOOR SYSTEM FOR A VENDING MACHINE

BACKGROUND OF THE INVENTION

The present invention relates to a vend door mechanism for a vending machine and more particularly to such a mechanism that is intended to prevent pilferage of product from the vending machine through the vend door area.

Certain types of vending machines, such as packaged snack vending machines which have a large glass front for viewing product stored in a product storage area, utilize a dispensing chamber below the glass and into which product is dropped by anyone of a number of dispensing mechanism designs. Typically such machines have an opening in the bottom of the product storage area through which product is dropped into the dispensing chamber. The dispensing chamber is accessible to a customer through a delivery door in the front of the machine. Such a delivery door is commonly hinged at the top. The customer generally pushes the door open to access any snack that is in the dispensing chamber. As the delivery door is pushed open a mechanism coupled to the door closes an anti-pilferage door over the opening between the product storage area and the dispensing chamber so that a person accessing the chamber cannot reach up into the storage area and remove product that has not been paid for. These mechanisms move the anti-pilferage door quickly so that opening of the delivery door a few degrees completely closes the anti-pilferage door. However, in many such designs there is sufficient clearance between the delivery door and the front of the machine and between the anti-pilferage door and the opening in the storage area when the delivery door is only slightly moved to allow a tool to be inserted and remove product from the storage area. Also, because there is a desire to vend larger and larger product, the opening between the storage area and dispensing chamber needs to be enlarged which, in turn, requires a larger anti-pilferage door and larger dispensing chamber. Thus, the mechanisms of the above described past designs have proven unsatisfactory because of the large size of the door that must be moved rapidly with very little force.

An alternative to such a design is a rotary vend door which as the customer rotates the door to provide access to the delivery chamber the back side of the cylindrical chamber moves to cover the opening between the storage area and the chamber. Such a device is shown, for example, in U.S. Pat. No. 5,375,737, assigned to the same assignee as the present invention. However, with the desire to increase product size to be vended from vending machines the size of the cylindrical rotary vend door must also be increased which provides space, size and weight problems for such designs.

SUMMARY OF THE INVENTION

The present invention overcomes the above described difficulties and disadvantages associated with such prior art devices by providing a vending machine in combination with an anti-pilferage door mechanism which moves rapidly in response to slight movement of the delivery door to completely close off the opening between the storage area and the dispensing chamber before it can be accessed with a pilfering tool, such as a wire.

The present invention includes a vending machine having a product storage area in an upper portion of the machine and a dispensing chamber below it which is accessible by a customer through a normally closed delivery door. There is an opening between the storage area and the dispensing chamber through which product drops after it has been selected by a customer and dispensed from the storage area in any one of several well known manners. There is an anti-pilferage door for covering the opening between the storage area and dispensing chamber when the delivery door is open, but is otherwise maintained in an open position to allow product to drop through the opening from the storage area. A rear door acts in conjunction with the anti-pilferage door to cover the opening between the storage area and the dispensing chamber. When the delivery door is moved from its normally closed position a relatively few degrees both the anti-pilferage and rear doors are swung to an overlapping closed position by a linkage mechanism connected to the delivery door. The delivery door also preferably is designed in conjunction with the customer access opening so that the access opening is blocked until the anti-pilferage and rear doors are in overlapping relationship.

The linkage mechanism interconnecting the delivery door with the anti-pilferage and rear doors so that movement of the delivery door causes the desired movement of the other doors preferably includes:

(a) a delivery door lever arm mounted at one end for pivotal movement with the delivery door and having a drive pin mounted at an opposite end;

(b) an anti-pilferage door lever arm mounted at one end for pivotal movement with the anti-pilferage door and having camming surfaces extending along a portion of its length;

(c) a rear door lever arm mounted at one end for pivotal movement with the rear door;

(d) a bell crank mounted for pivoting about a fixed center pivot and having a first lever arm having a cam follower in engagement with the camming surfaces in the anti-pilferage door lever arm and a second lever arm having a drive pin pivotally engaging a first end of a rear door drive link, a second end of the link pivotally engaging a second end of the rear door lever arm;

(e) a drive link pivotally mounted at a first end to the drive pin in the opposite end of the delivery door lever arm and mounted at an opposite end to the first lever arm of the bell crank for causing pivotal movement thereof as the delivery door is moved.

The linkage mechanism is preferably mounted on one side of the dispensing chamber. The delivery door is preferably biased towards its closed position and the anti-pilferage and rear doors biased toward their normally open positions by a spring and lever mechanism positioned on the opposite side of the dispensing chamber from the linkage mechanism.

DETAILED DESCRIPTION OF THE PREFERRED EMBODIMENT

Figure 1:
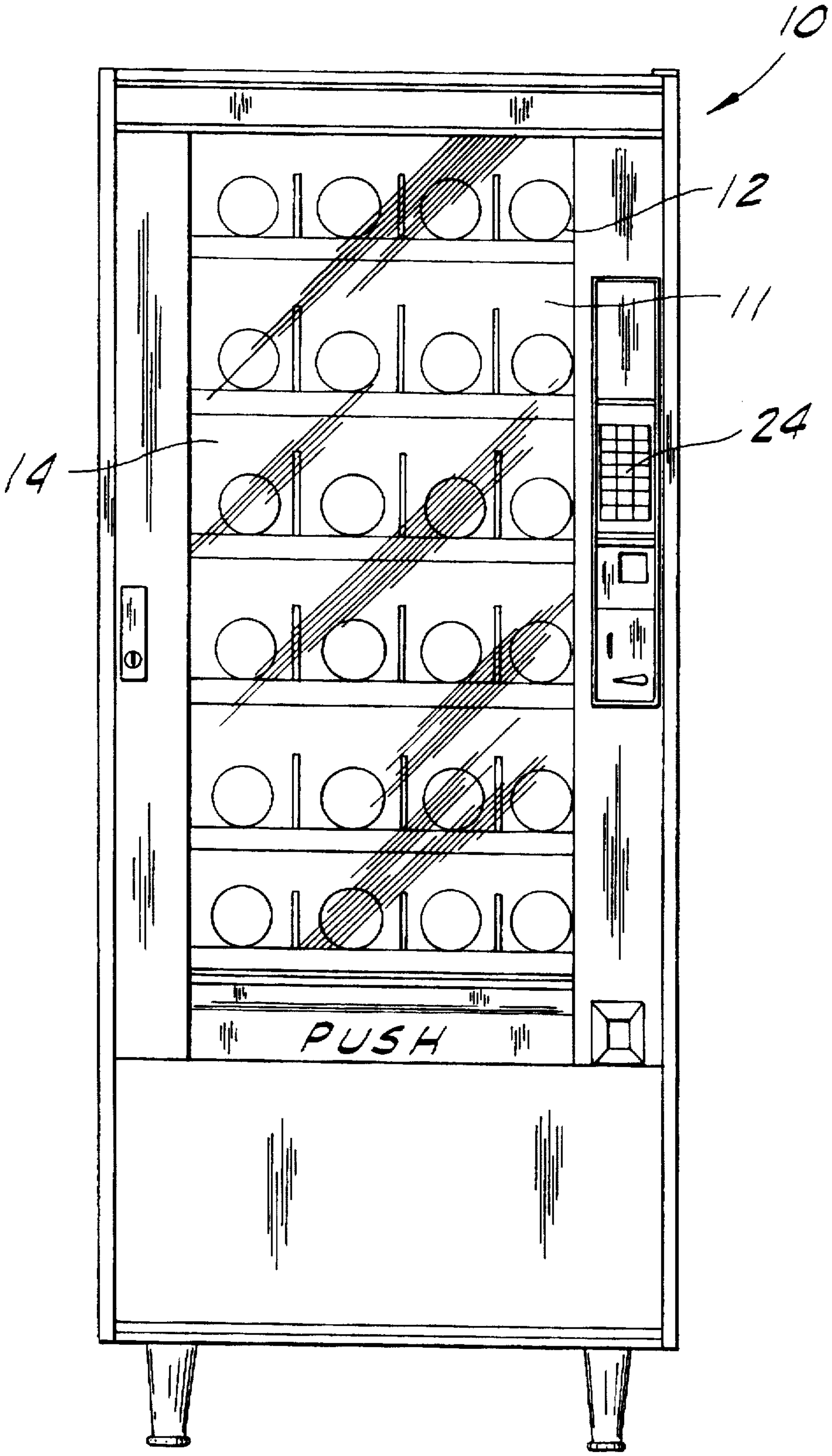
FIG. 1 is a front elevational view of a vending machine containing a preferred embodiment of the anti-pilferage door system of the present invention.
Figure 2:
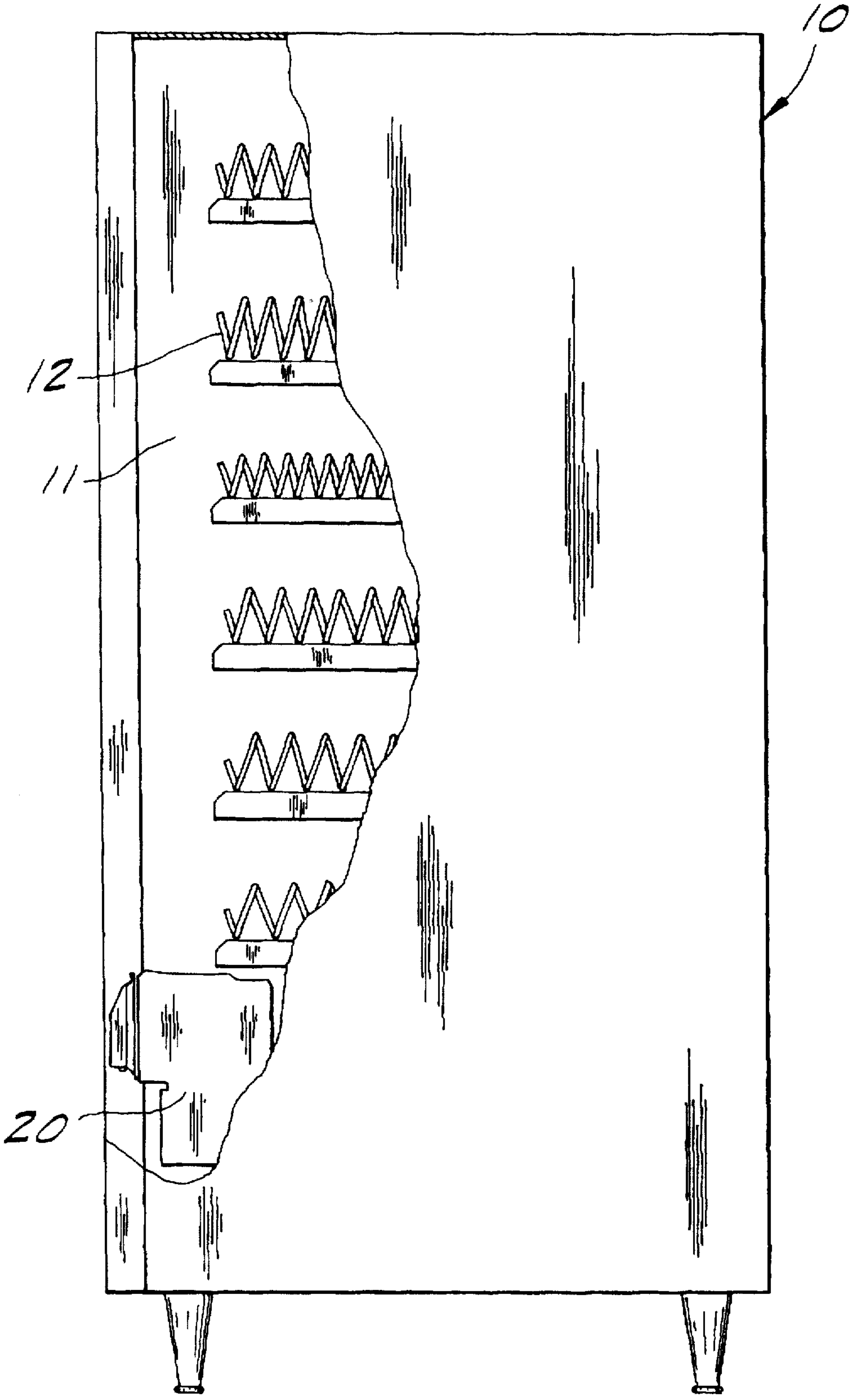
FIG. 2 is a side view of the vending machine of FIG. 1 partially cutaway and showing the position of the dispensing chamber and anti-pilferage door system of the preferred embodiment of the present invention.

The vending machine of the present invention is shown generally as 10 in FIGS. 1 and 2 and includes a product storage area 11 with a plurality of conventional spiral vending trays 12 which can be seen through the glass front panel 14. Positioned below the glass is a snack dispensing chamber assembly 20 into which product is dropped through an opening in the bottom of the product storage area 11. The dispensing chamber assembly 20 includes a delivery door 22 on the front of the machine that allows a customer access to the dispensing chamber to remove a selection that has been deposited there from the spiral vending trays 12 in a well known manner. A customer interactive area 24 is provided with a selection key panel, coin deposit and coin return, all of conventional construction and use.

Figure 4:
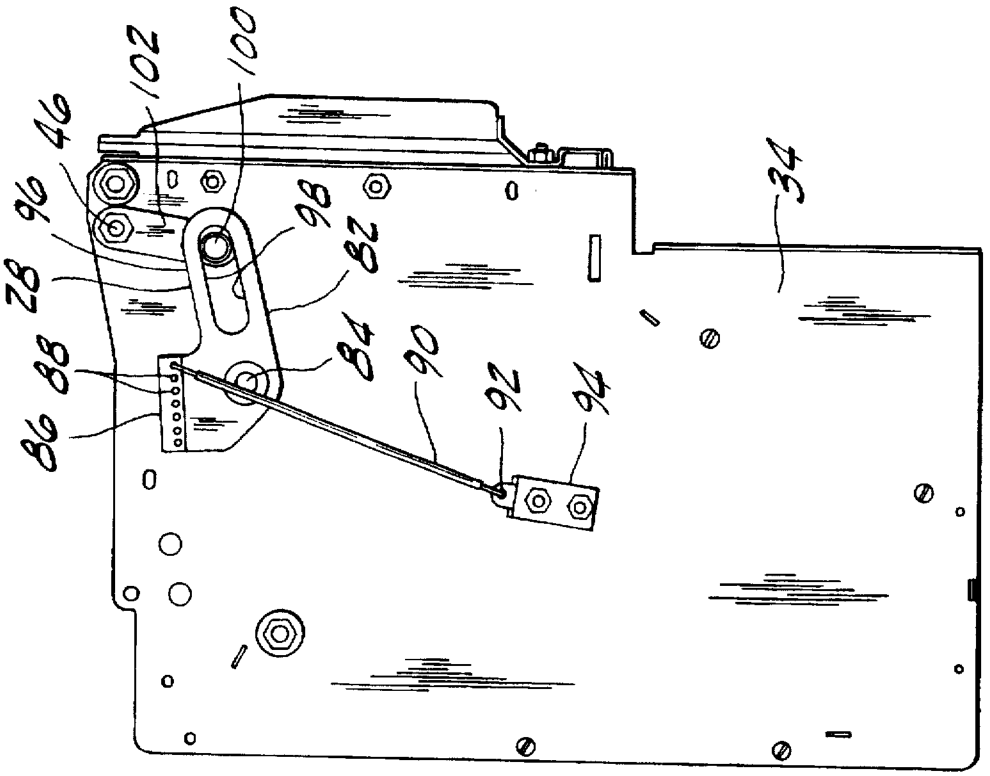
FIG. 4 is a left side view of the dispensing chamber showing the spring biasing mechanism with the delivery door in the closed position.
Figure 3:
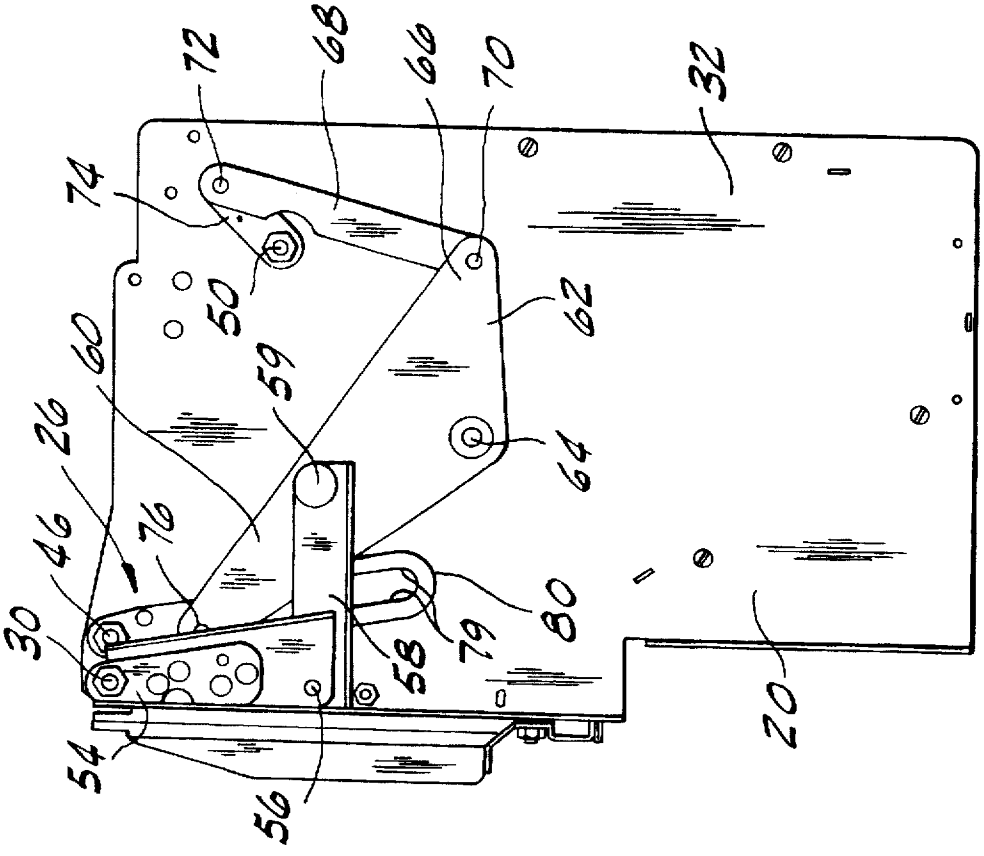
FIG. 3 is a right side view of the dispensing chamber showing the anti-pilferage door linkage mechanism with the delivery door in the closed position.
Figure 5:
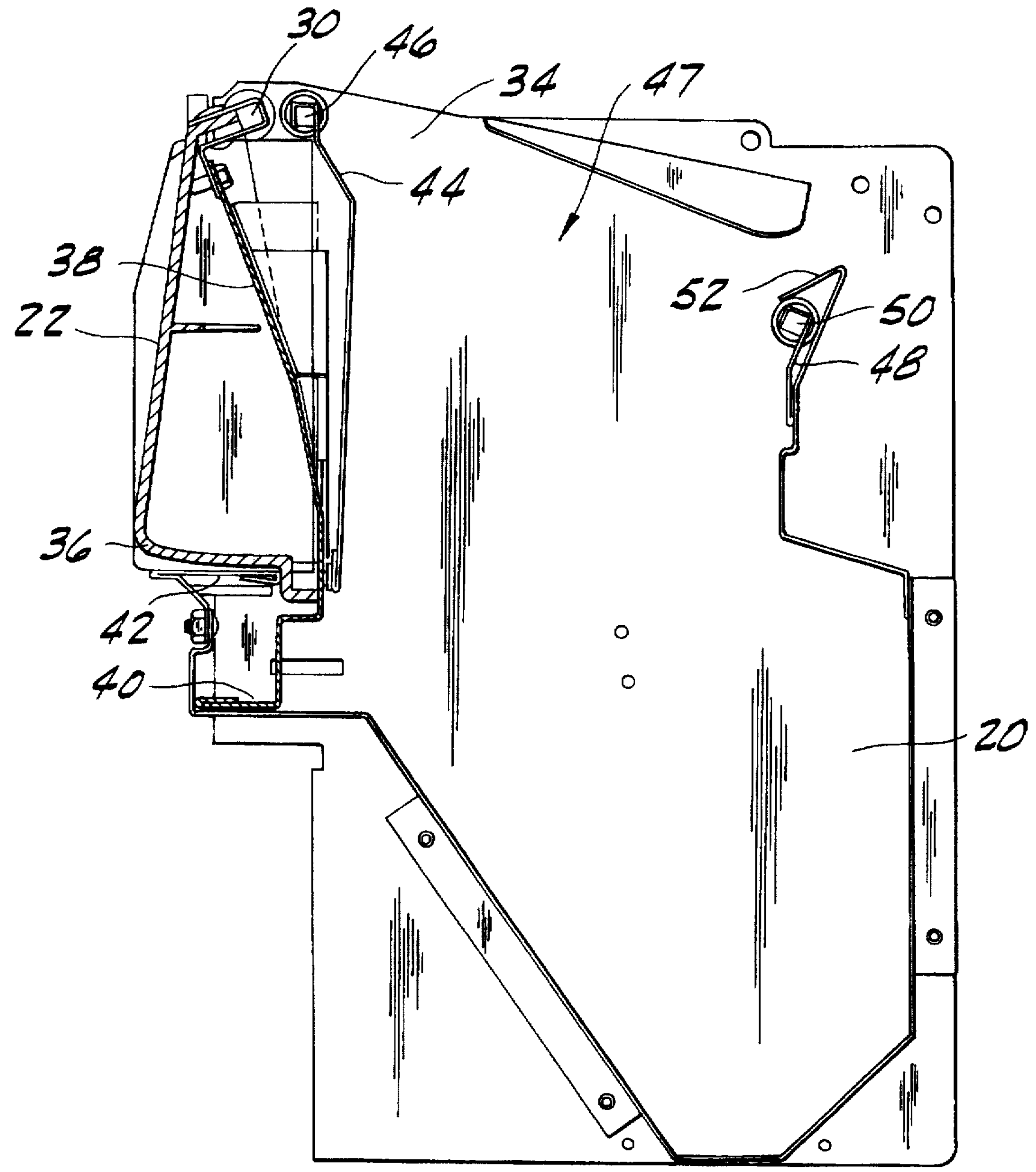
FIG. 5 is a cross-sectional view through the middle of the dispensing chamber with the delivery door in the closed position.

In FIGS. 3–5 the dispensing chamber assembly 20 is shown removed from the vending machine 10 and with the delivery door 22 positioned in the closed position. FIG. 3 shows the right side of dispensing chamber assembly 20 with the linkage assembly 26 associated with the delivery door 22 to operate the anti-pilferage system as discussed below. Likewise, FIG. 4 shows the left side of the dispensing chamber assembly 20 with the spring biasing assembly 28 discussed in detail below.

As best seen in FIG. 5, the delivery door 22 is fixedly mounted to a support rod 30 which is pivotally mounted at its ends to the side members 32 and 34 of the dispensing chamber 20 to permit swinging movement of the delivery door 22. The delivery door 22 is constructed with a hard plastic outer piece 36 which is pushed by a customer to open the delivery door 22. The inner surface of the delivery door 22 is formed of a sheet metal piece 38 which is formed with a lower extended lip 40 that overlaps a mating sheet metal piece 42 mounted to the lower front of the vending machine housing so that as the delivery door 22 is partially opened the overlap prevents insertion of a wire or other pilferage device into the delivery chamber 20 before the rest of the anti-pilferage mechanism is fully in position.

An anti-pilferage door 44 is similarly fixedly mounted to a rod 46 which is pivotally mounted at its ends in the side members 32 and 34. The anti-pilferage door 44 is made of sheet metal and in the closed position of the delivery door 22 rests against the inside of the delivery door so that the opening 47 from the product storage area into the dispensing chamber 20 is maximized.

A rear door 48 is fixedly mounted to a rod 50 which is pivotally mounted at its ends to side members 32 and 34. The rear door 48 is of sheet metal construction. A rear panel 52 forms an upper rear portion of the dispensing chamber 20 and has an upper end which is folded to over hang the pivotal end of the rear door to prevent a wire or other pilferage device from being pushed past the rear door 48 and up into the product storage area 11.

Referring more particularly to the linkage assembly 26, as seen in FIG. 3, it includes a delivery door lever arm 54 fixedly mounted at one end thereof to the end of rod 30 for pivotal movement with it and the delivery door 22. An opposite end of lever arm 54 is provided with a drive pin 56 which pivotally engages a first end of a drive link 58. The drive link 58 has a second end pivotally mounted through a drive pin 59 to a first leg 60 of a bell crank 62 which is pivotally mounted at a fixed center pivot point by pin 64 to side member 32. A second leg 66 of bell crank 62 has a drive link 68 pivotally mounted thereto at one end of the drive link 68 by pin 70. A second end of the drive link 68 is pivotally mounted by pin 72 to a first end of a rear door lever arm 74. An opposite end of the rear door lever arm 74 is mounted to the end of rear door mounting rod 50 for pivotal movement with the rod 50 and rear door 48.

The first end of bell crank 62 has rotationally mounted by pin 76 to the back side thereof a cam follower 78 which engages dual camming surfaces 79 formed in anti-pilferage door lever arm 80. Anti-pilferage door lever arm 80 is mounted at one end to rod 46 for rotation therewith and with the anti-pilferage door 44 mounted thereto.

Referring now to the construction of the spring biasing assembly 28, as seen in FIG. 4, it includes a bell crank 82 mounted at a center pivot point by pin 84 to the side member 34. One end 86 of bell crank 82 is formed with a plurality of positioning holes 88 for receiving an end of a tensioning spring 90 therein. An opposite end of tensioning spring 90 is received in a single hole 92 formed in a bracket 94 fixed to the side member 34. Another end 96 of bell crank 82 is provided with dual camming surfaces 98 formed therein for receiving a cam follower 100. Cam follower 100 is rotationally mounted to one end of a drive link 102 which has an opposite end mounted to rod 46 for pivotal movement therewith and with anti-pilferage door 44.

Referring to the operation of the anti-pilferage system of the present invention, when the delivery door 22 is in the closed position, as seen in FIGS. 3–5, the overlap between the lip 40 formed on the inner sheet metal piece 38 of door 22 and corresponding piece 40 mounted to the front of the vending machine 10 prevent the insertion of a wire or similar pilferage device beneath the door 22. This overlap persists through the initial few degrees of pivoting of door 22, for example, 10–15 degrees. Also, when the delivery door is completely closed the anti-pilferage door 44 and rear door 48 are positioned out of the way of the opening of opening 47 between the product storage area 11 and the dispensing chamber 20 so that items from the storage area may freely fall from the storage area into the dispensing area for customer retrieval.

Figure 8:
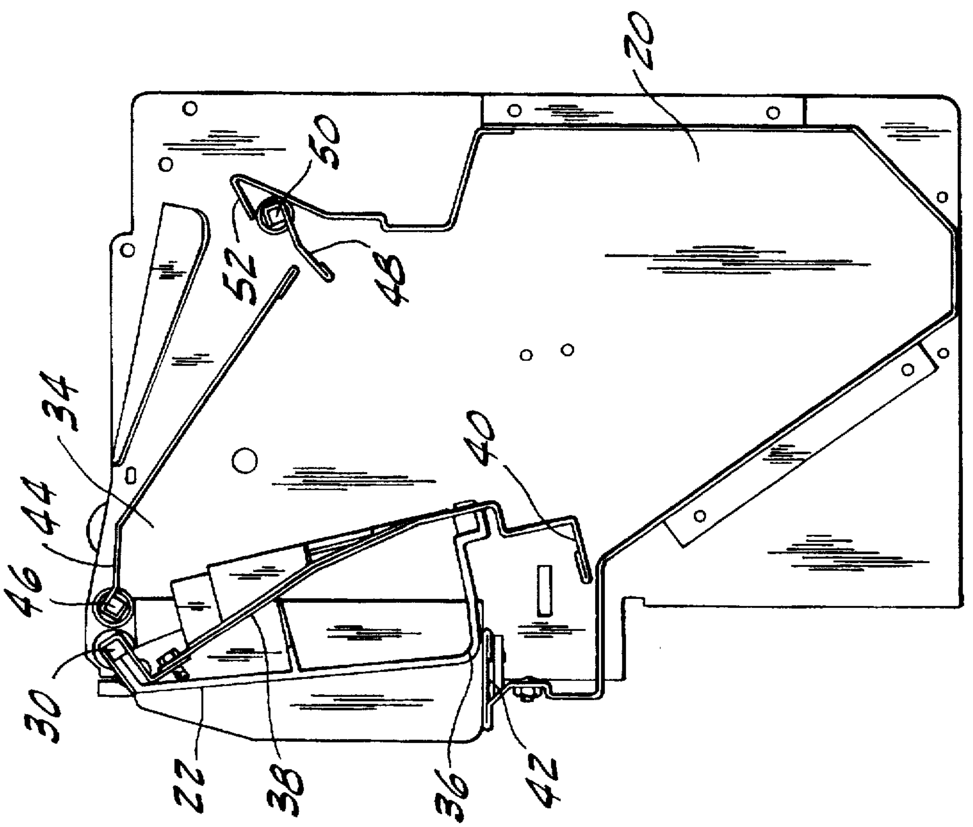
FIG. 8 is a cross-sectional view through the middle of the dispensing chamber with the delivery door in the partially open position.
Figure 6:
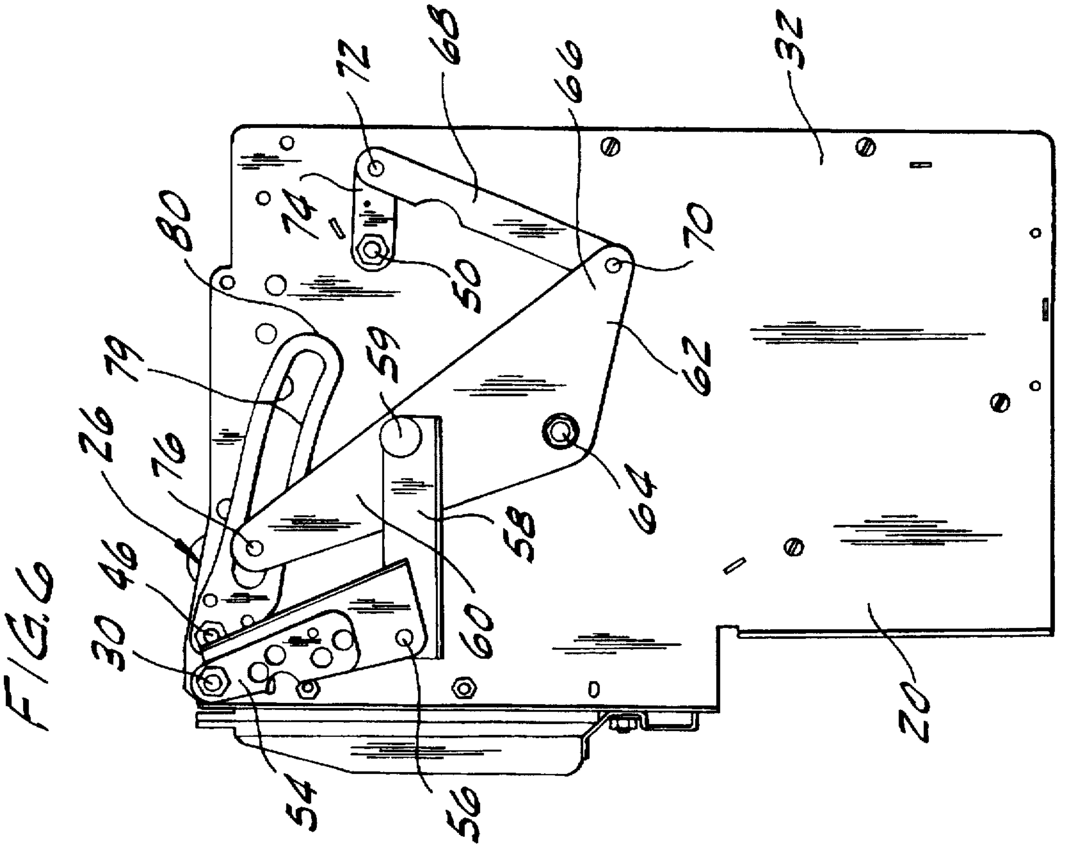
FIG. 6 is a right side view of the dispensing chamber showing the anti-pilferage door linkage mechanism with the delivery door in the partially open position.

As a customer pushes on delivery door 22 to begin opening it rod 30 is pivoted which, in turn, pivots delivery door lever arm 54. As delivery door lever arm pivots it causes movement of drive link 58 which, in turn, causes pivoting of bell crank 62 which moves its first leg 60 upward, as seen in FIG. 6, which causes substantial rotation of anti-pilferage door lever arm 80 and thus substantial movement of anti-pilferage door 44, as seen in FIG. 8. Likewise, as the bell crank 62 is pivoted it causes pivoting of drive link 68 which, in turn, causes pivoting of rear door lever arm 74 that forces pivoting of rod 50 and thus rear door 48. As depicted, the movement of the delivery door from the position shown in FIG. 5 to that of FIG. 8 is approximately 13.5°. Thus, while the delivery door 22 has only been moved that small amount and the overlap between the lip 40 on the bottom of the delivery door and the corresponding part 42 on the housing continues, the anti-pilferage and rear doors are brought into overlapping position and shortly thereafter into engagement so that no wire or similar device can be fed up into the product storage area 11 from the product removal opening as the delivery door 22 is opened.

Figure 9:
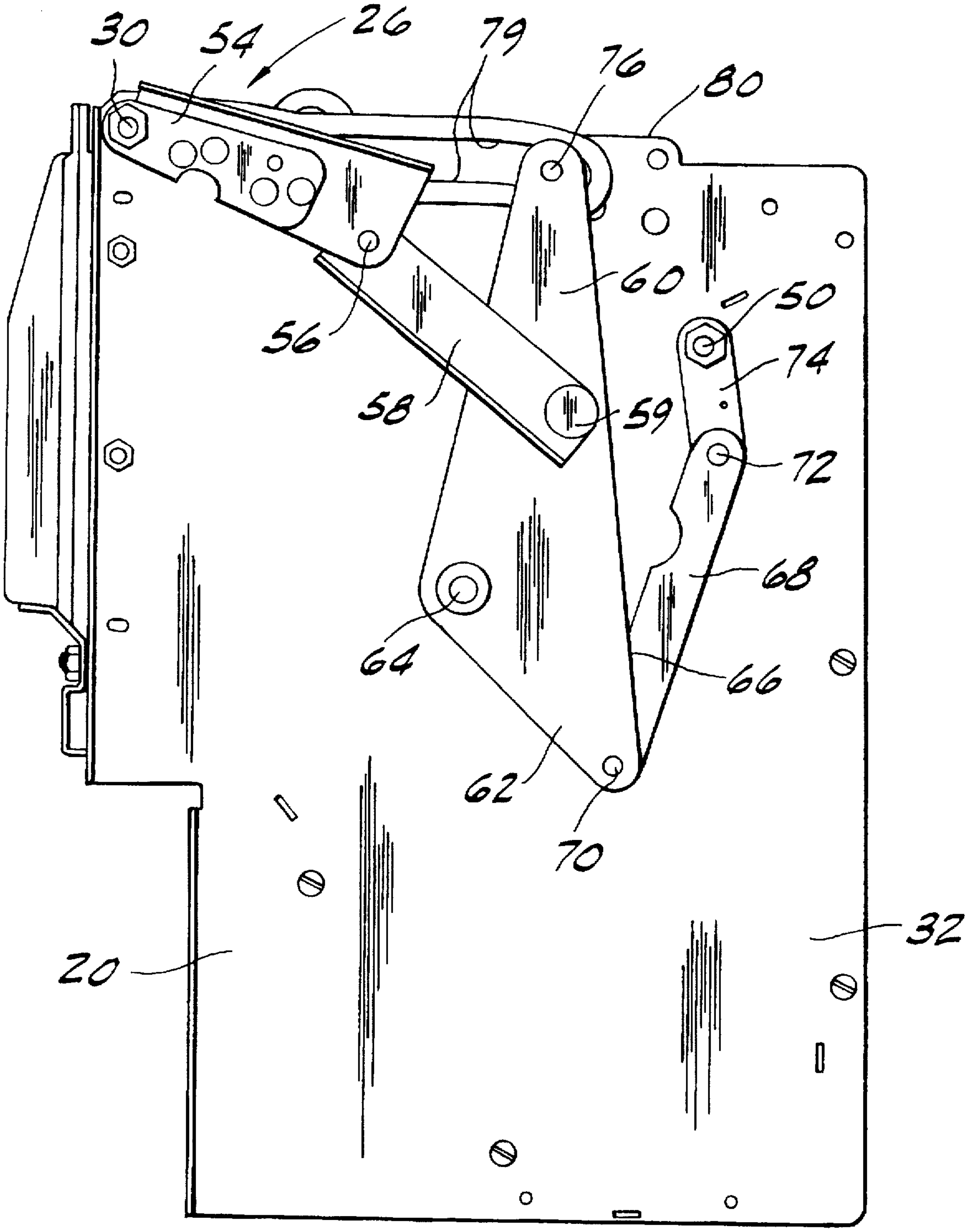
FIG. 9 is a right side view of the dispensing chamber showing the anti-pilferage door linkage mechanism with the delivery door in the fully open position.
Figure 10:
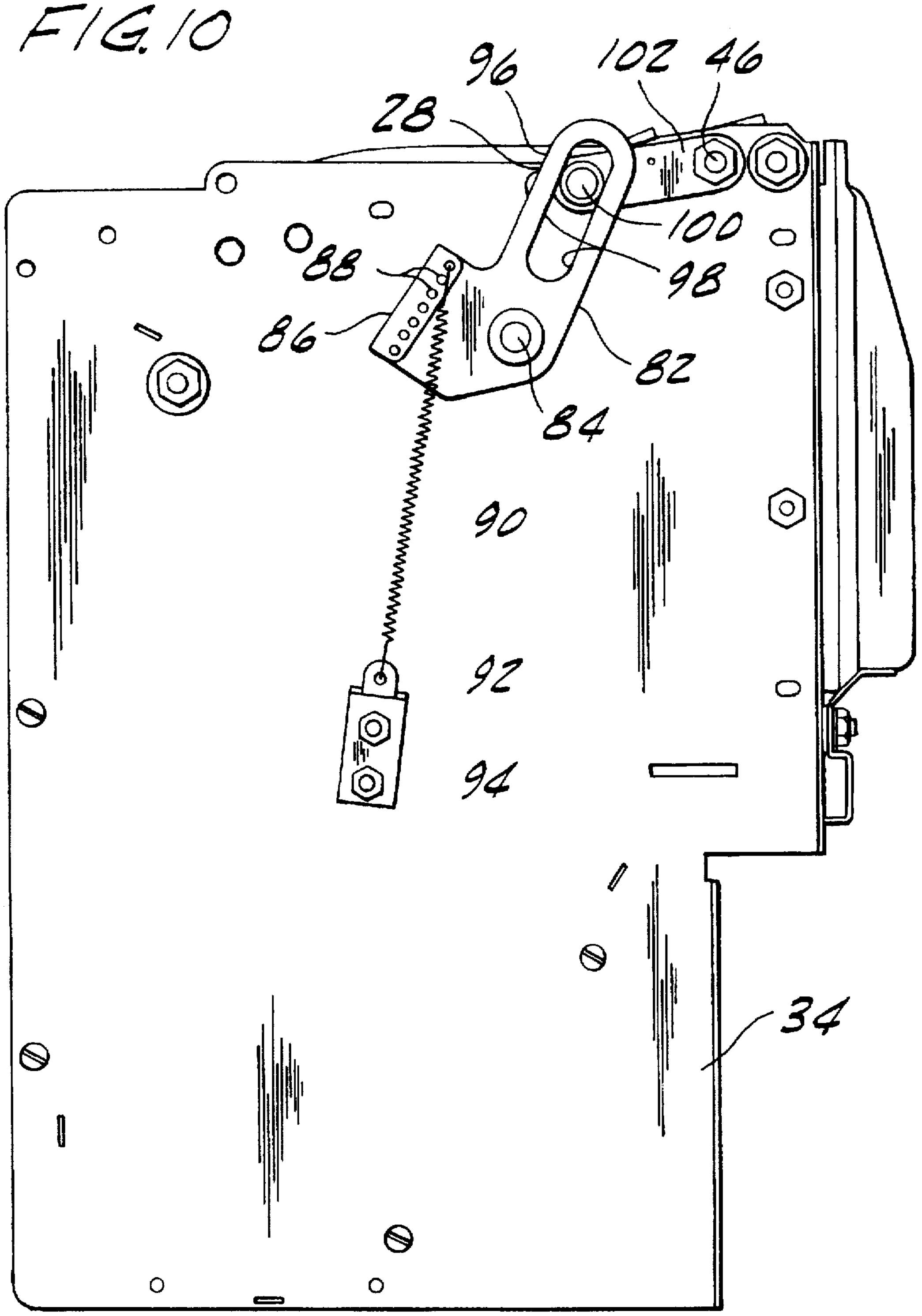
FIG. 10 is a left side view of the dispensing chamber showing the spring biasing mechanism with the delivery door in the fully open position.
Figure 11:
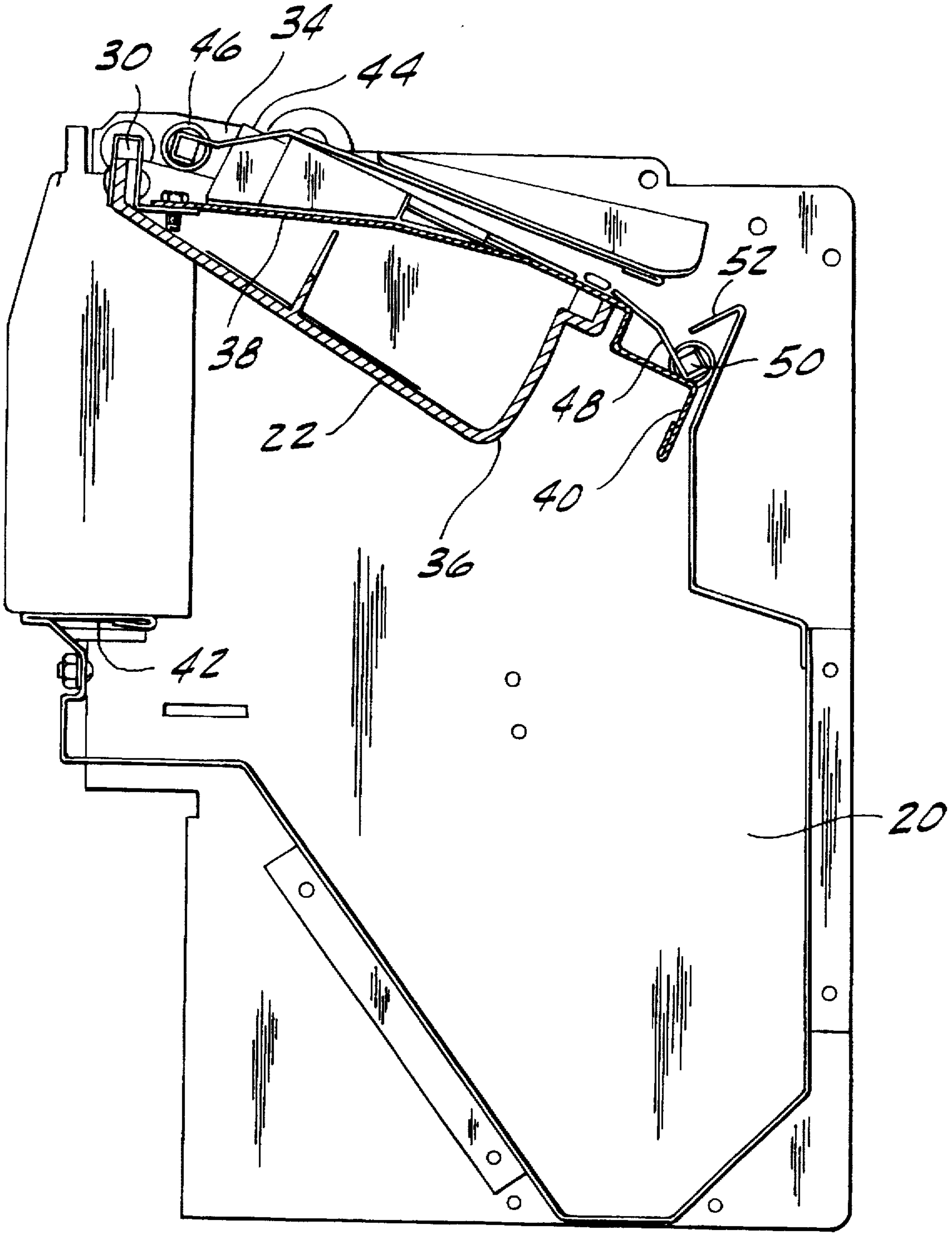
FIG. 11 is a cross-sectional view through the middle of the dispensing chamber with the delivery door in the fully open position.
Figure 12:
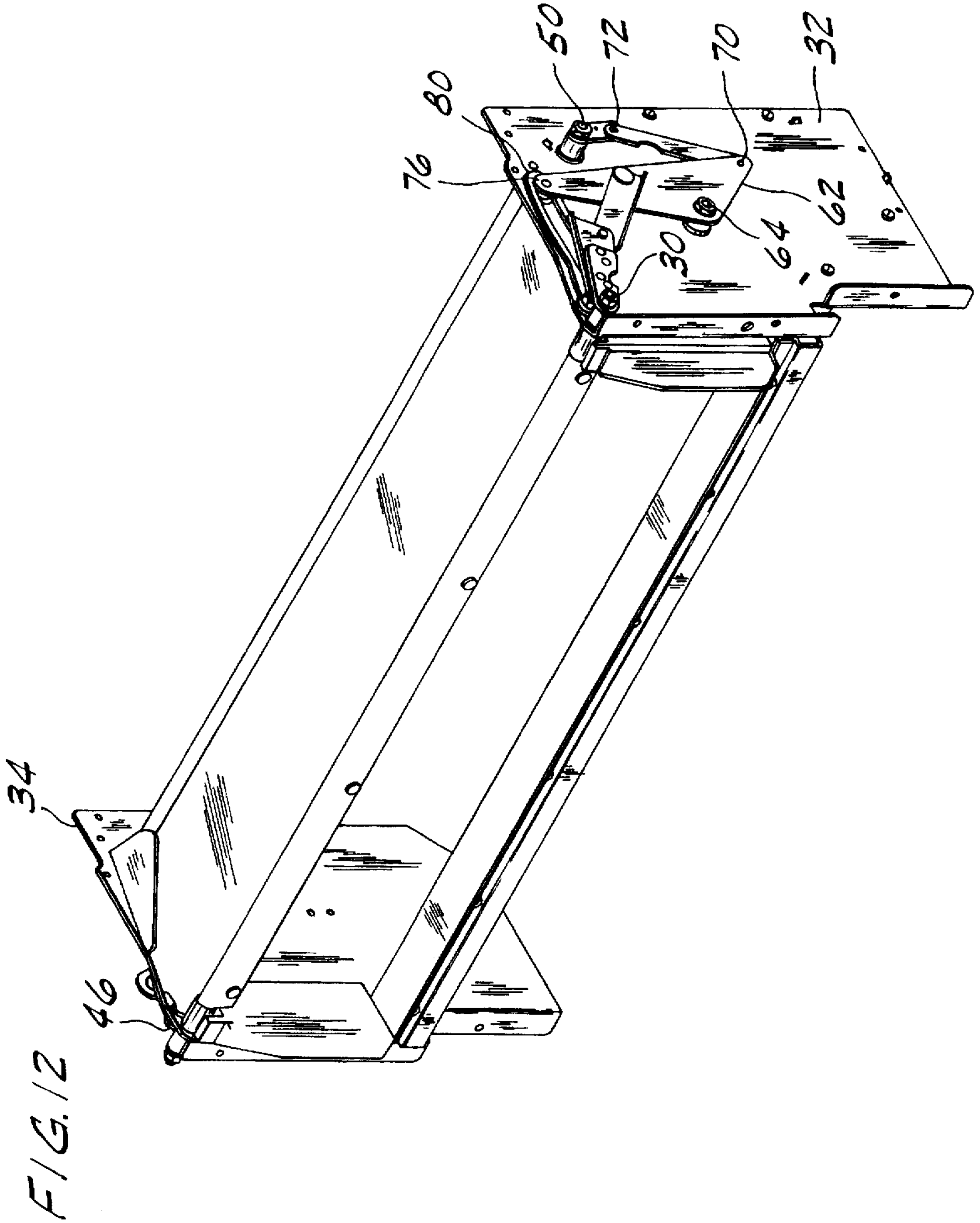
FIG. 12 is a perspective view of the dispensing chamber with the delivery door in the fully open position and the anti-pilferage doors in the closed position.

As the delivery door continues rotation to its fully open position, as shown in FIGS. 9–11, the delivery door lever arm 54 and drive link 58 continue to pivot upwardly, as seen in FIG. 9, causing the bell crank 62 to pivot and follower 78 to move along camming surfaces 79 causing the anti-pilferage door 44 to come to rest against stops 104 on each side member 32 and 34. In the fully open position the rear side of lip 40 on the inside of the delivery door 22 engages the rear door 48 where it is connected to the rod 50 and thus acts as a stop for the open position of the delivery door 22. In this position the rear door 48 lies against the inside of the delivery door 22 so there is no opening remaining to insert a wire or similar device. In this position the customer can remove the purchased item and release the door for closing.

Figure 7:
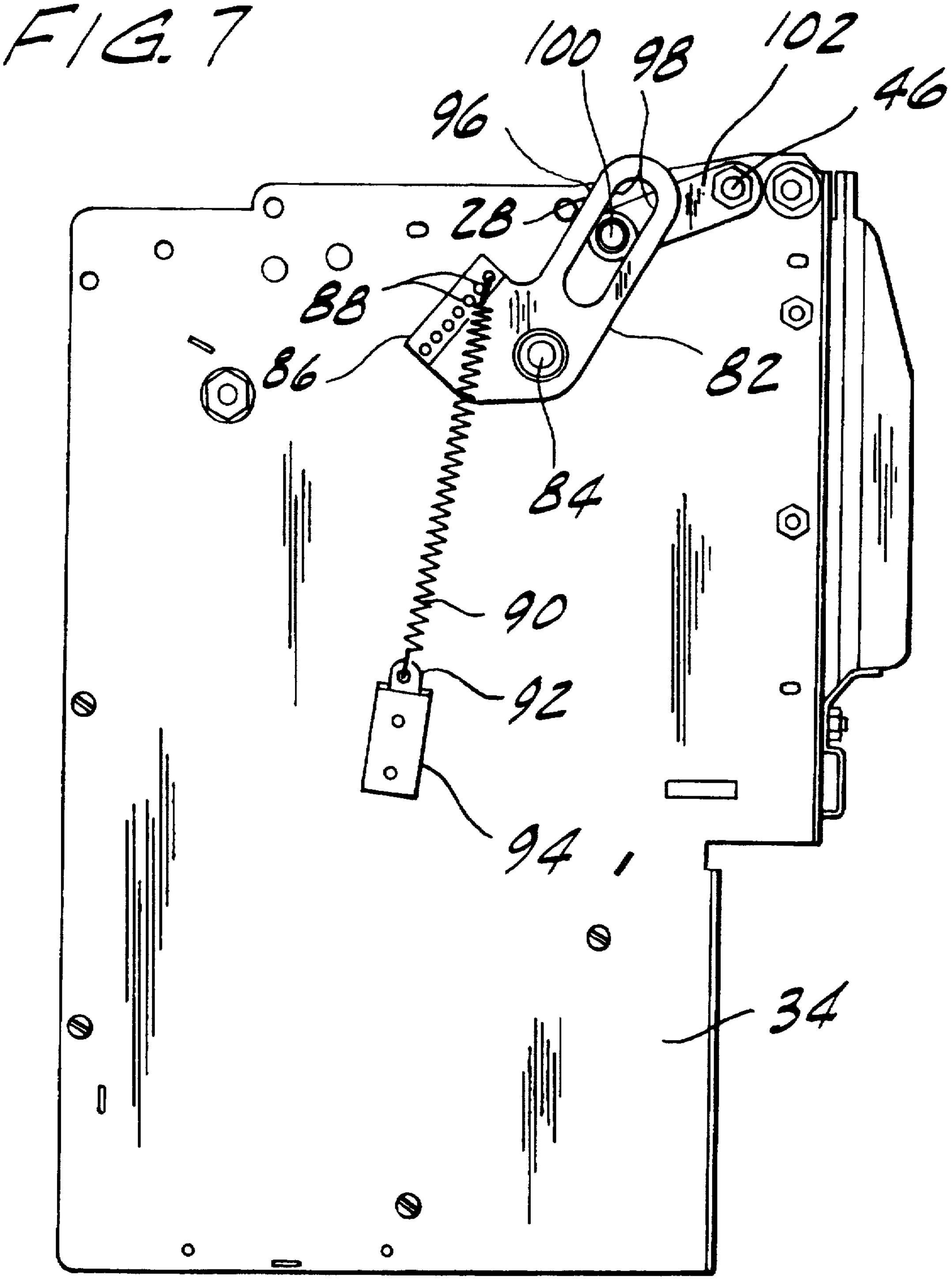
FIG. 7 is a left side view of the dispensing chamber showing the spring biasing mechanism with the delivery door in the partially open position.

Although the delivery door 22 could be left to close by gravity if desired, in the preferred embodiment described above a spring biasing assembly 28 is provided to assist in reducing the necessary force to open the door 22 as well as providing a biasing force to close the door 22. As the door 22 is initially pivoted from the closed position, as shown in FIG. 5, to the partially open position, as shown in FIG. 8, the drive link 102 is pivoted causing bell crank 82 to pivot from the position shown in FIG. 4 to that shown in FIG. 7. The initial force the customer has to overcome to open door 22 is designed to be approximately 3–3.5 pounds as established by placing the spring 90 in the appropriate hole 88. As the door 22 is pivoted this force is decreased since the spring length is decreased. This force reduction continues as the door 22 is pivoted to its fully opened position. As the door 22 is released from its fully open position gravity and the spring force from spring 90 return the door 22 to its closed position.

What is claimed is:

1. In combination with a vending machine having a product storage area above and in communication through an opening therein with a dispensing chamber having a product access opening for customer removal of products dispensed into the chamber from the storage area, an anti-pilferage door mechanism comprising:

a delivery door mounted at an upper edge thereof to the vending machine for pivotal movement about a horizontal axis from a normally closed position wherein it covers the product removal opening to an open position wherein a customer can remove product from the dispensing chamber;

an anti-pilferage door mounted at an edge thereof to the vending machine for pivotal movement about a horizontal axis from a normally open position wherein product from the storage area can pass through the opening into the dispensing chamber and a closed position wherein it substantially covers the opening in the storage area;

a rear door mounted at an edge thereof to the vending machine for pivotal movement about a horizontal axis from a normally open position wherein product from the storage area can pass through the opening into the dispensing chamber and a closed position wherein another edge thereof overlaps the anti-pilferage door to close off the product storage area opening;

linkage means interconnecting said delivery door, anti-pilferage door and rear door such that as the delivery door is pivoted a relatively few degrees the anti-pilferage and rear doors are pivoted from their normally open positions to their closed positions.

2. The combination of claim 1, including a spring means for biasing the delivery door towards its normally closed position and the anti-pilferage and rear doors towards their normally open positions.

3. The combination of claim 2 wherein the linkage means is mounted to one side of the dispensing chamber and the spring means is mounted to another side.

4. The combination of claim 1 wherein the linkage means is mounted to one side of the dispensing chamber.

5. The combination of claim 1 wherein an edge of the delivery door opposite the mounting edge engages along its length the mounting edge of the rear door when the delivery door is in its open position.

6. The combination of claim 5 wherein the linkage means includes:

a delivery door lever arm mounted at one end for pivotal movement with the delivery door and having a drive pin mounted at an opposite end;

an anti-pilferage door lever arm mounted at one end for pivotal movement with the anti-pilferage door and having camming surfaces extending along a portion of its length;

a rear door lever arm mounted at one end for pivotal movement with the rear door;

a bell crank mounted for pivoting about a fixed center pivot and having a first lever arm having a cam follower engaging the camming surfaces in the anti-pilferage door lever arm and a second lever arm having a drive pin pivotally engaging a first end of a rear door drive link, a second end of the link pivotally engaging a second end of the rear door lever arm;

a drive link pivotally mounted at a first end to the drive pin in the opposite end of the delivery door lever arm and mounted at an opposite end to the first lever arm of the bell crank for causing pivotal movement thereof as the delivery door is moved.

7. The combination of claim 1 wherein the delivery door and the product access opening in the vending machine are so constructed and arranged that access to the dispensing chamber is blocked until the anti-pilferage and rear doors are in overlapping relationship.

8. In combination with a vending machine having a product storage area above and in communication through an opening therein with a dispensing chamber having a product access opening for customer removal of products dispensed into the chamber from the storage area, an anti-pilferage door mechanism comprising:

a delivery door mounted at an upper edge thereof to the vending machine for pivotal movement about a horizontal axis from a normally closed position wherein it covers the product removal opening to an open position wherein a customer can remove product from the dispensing chamber;

an anti-pilferage door mounted at an edge thereof to the vending machine for pivotal movement about a horizontal axis from a normally open position wherein product from the storage area can pass through the opening into the dispensing chamber and a closed position wherein it substantially covers the opening in the storage area;

a rear door mounted at an edge thereof to the vending machine for pivotal movement about a horizontal axis from a normally open position wherein product from the storage area can pass through the opening into the dispensing chamber and a closed position wherein another edge thereof overlaps the anti-pilferage door to close off the product storage area opening;

a linkage assembly including:

(a) a delivery door lever arm mounted at one end for pivotal movement with the delivery door and having a drive pin mounted at an opposite end;

(b) an anti-pilferage door lever arm mounted at one end for pivotal movement with the anti-pilferage door and having camming surfaces extending along a portion of its length;

(c) a rear door lever arm mounted at one end for pivotal movement with the rear door;

(d) a bell crank mounted for pivoting about a fixed center pivot and having a first lever arm having a cam follower engaging the camming surfaces in the anti-pilferage door lever arm and a second lever arm having a drive pin pivotally engaging a first end of a rear door drive link, a second end of the link pivotally engaging a second end of the rear door lever arm;

(e) a drive link pivotally mounted at a first end to the drive pin in the opposite end of the delivery door lever arm and mounted at an opposite end to the first lever arm of the bell crank for causing pivotal movement thereof as the delivery door is moved.

* * * * *